United States Patent [19]
Henegar et al.

[11] 3,761,915
[45] Sept. 25, 1973

[54] OUTPUT COMMAND DECODER FOR NUMERICAL CONTROL EQUIPMENT

[75] Inventors: Hubert B. Henegar; Robert J. Patterson, both of Detriot, Mich.

[73] Assignee: The Bendix Corporation, Southfield, Mich.

[22] Filed: Apr. 26, 1972

[21] Appl. No.: 249,448

[52] U.S. Cl............................ 340/347 DD, 235/155
[51] Int. Cl............................................. H03r 13/00
[58] Field of Search ............... 340/347 DD, 174.1 J, 340/147 MT, 172.5; 318/569, 574; 235/151.11

[56] References Cited
UNITED STATES PATENTS
3,239,832   3/1966   Renard....................... 340/347 DD
3,506,815   4/1970   Stone.......................... 340/347 DD
3,535,497   10/1970  Byrne.......................... 340/347 DD

*Primary Examiner*—Thomas A. Robinson
*Attorney*—Lester L. Hallacher et al.

[57] ABSTRACT

The invention is directed to a system for decoding output commands from a computer utilized with a numerical control system. When a command is to be directed to a particular external device controlled by the N/C system, an eight bit word is addressed to a decoding system. The decoding system then decodes the eight bit word to actuate the particular device to be controlled. Hence, only one address need be utilized to control 256 external devices. The address is that of the decoding system. The invention thus preserves substantial address capacity in the computer of the N/C system and thereby greatly increases the flexibility of the system.

10 Claims, 2 Drawing Figures

OUTPUT COMMAND DECODER FOR NUMERICAL CONTROL EQUIPMENT

CROSS REFERENCE TO RELATED APPLICATIONS

The invention described herein is an improvement of the system described in application Ser. No. 62,244 filed Aug. 6, 1970 by Hubert B. Henegar and Robert J. Patterson, and said application is useful in understanding the environment in which the invention is employed.

The invention described herein can be employed in a system also including the invention described in application Ser. No. 249,447 "Numerical Control System Control Program Loader," filed of even date herewith by Hubert B. Henegar and assigned to the assignee of the instant application.

The invention described herein can be employed in a system also including the invention described in application Ser. No. 249,446 "System For Providing Interrupts in a Numerical Control System" filed of even date herewith by Hubert B. Henegar and assigned to the assignee of the instant application.

The invention described herein can be employed in a system also including the invention described in application Ser. No. 249,445 "Control System For Dual Tape Readers in a Numerical Control System" filed of even date herewith by Hubert B. Henegar and assigned to the assignee of the instant application.

BACKGROUND OF THE INVENTION

In numerical control equipment, a computer which is capable of storing programmed information is utilized not only to store the information but also to utilize the stored information to control the movement of servos, pulse motors, or to apply voltages to the deflection coils of a CRT to thus control the movement of an element such as a cutting tool, pen, or electron beam. Thus, in addition to inputing and outputing data to various external devices, the computer must also issue a number of on-off commands. Examples of such commands are "Start Tape Reader," "Stop Feed," "Inches per Revolution," etc. In prior art systems, the on-off commands are usually effected by the computer executing an output instruction to a specific device, such as the servo. Accordingly, the computer outputs a binary number which represents the address of the specific device to be actuated and the external circuitry of the N/C system senses the address and actuates the specific device being addressed. This technique is feasible and is frequently used in prior art systems. However, it suffers the inherent disadvantage of requiring a device address for each individual device. Thus, the address storage capability of the computer is rapidly used up when a large number of external devices are to be employed with the computer. Furthermore, because each external device requires a specific address, there is a possibility that similar but nevertheless unidentical N/C systems will utilize the same address for different external devices because they contain different optional features. This negates interchangeability of the systems and thereby eliminates a very desirable feature of N/C systems.

SUMMARY OF THE INVENTION

The inventive system overcomes the deficiencies of the prior art systems by the provision of an external device decoder so that only one address need be stored in the computer. The computer addresses the decoder and sends a command word which is decoded to energize a particular external device. The command word consists of an eight bit code which is received by the decoder system in parallel fashion. Thus, when the external decoder device is addressed by the computer, it also receives the eight bit command word which is decoded and used to energize the specific external device as directed by the computer. By utilizing an eight bit command word, 256 external devices can be turned on or off by the computer through the single address for the decoding system. Thus, the address storage capability of the computer is greatly increased because a single address can be utilized to turn 256 external devices on or off. Furthermore, each on-off command required for the external devices is assigned a permanent and unique command number so as to avoid possible future conflicts when controls with various mixes of options are built. Hence, a particular combination of the eight bits is preserved to represent a particular external device, or function, for all systems irrespective of whether or not a particular system incorporates that device or function. In this manner, external devices, or functions, can be subsequently added and interchangeability between systems is assured.

DETAILED DESCRIPTION

Figure 1:
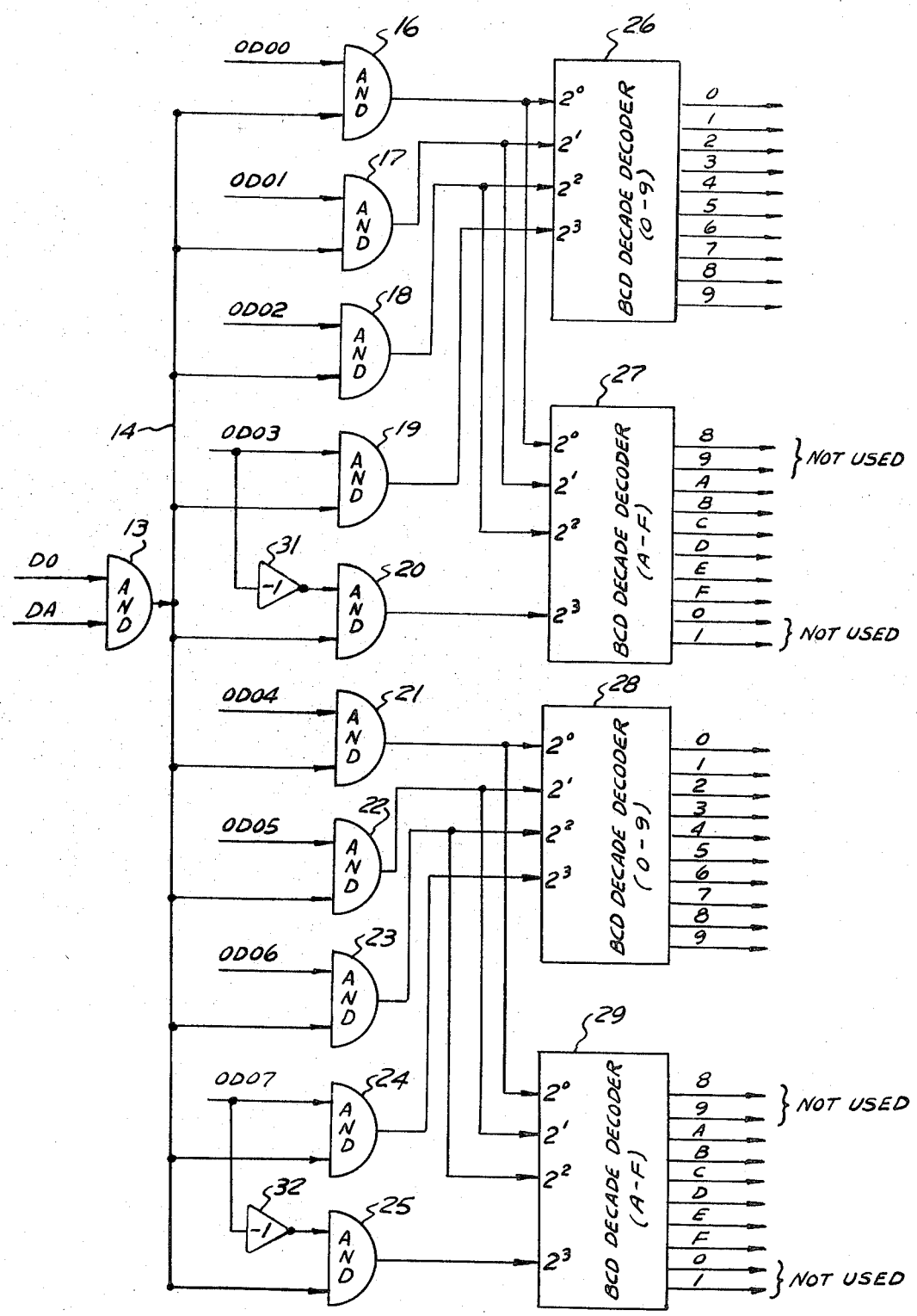
FIG. 1 shows a preferred embodiment of the inventive decoding system.

The preferred embodiment of the inventive output command decoder includes an AND Gate 13 which receives a DA and a DO signal. The DA signal is the decoder address signal which is directed to the inventive decoder when an external device is to be prepared by the computer or is to be turned on or off, that is to cease or initiate execution of motions directed by control signals. The generation and utilization of the control signals is not within the purview of this application but is described in the above-referenced application Ser. No. 62,244. A device output signal (DO) is also provided as an input signal to AND Gate 13 so that when both the DO and DA signals are available to AND Gate 13, an output pulse is applied over Input Line 14 to one input terminal of a series of AND Gates 16 through 25. Because both the DO and DA signals must be present to actuate the inventive decoder, they collectively can be considered to be "ready signals." Thus, the simultaneous presence of the ready signals results in the generation of an actuating signal as the output of AND 13.

Each of AND Gates 16 through 25 is a two input AND Gate and thus two inputs must simultaneously be present before a logic ONE output is yielded. Accordingly, AND Gates 16 through 19, respectively, receive an ODO0 signal through ODO3 signal on their second input terminals. In a similar manner, AND Gates 21 through 24, respectively, receive ODO4 through ODO7 input signals.

The ODO0 through ODO7 signals are the output data signals from the computer and form an eight bit command word from various combinations of logic ZERO's and ONE's supplied as the 8 OD signals. Thus, because eight bits are available, 256 different combinations of ZERO's and ONE's are available so that 256 distinct devices can be addressed simply by varying the combinations of logic ONE's and ZERO's available as input pulses to AND Gates 16 through 24. It will be understood by those skilled in the art that more or less than 256 external devices can be addressed simply by increasing or decreasing the number of AND Gates and by changing the number of OD signals applied to the AND Gates. Thus, if $n$ OD signals are available, $2^n$ combinations are possible and $2^n$ external devices can be uniquely energized. However, the number of OD signals possible is a function of the computer and accordingly cannot be increased above the number of output lines available from the computer.

The output terminals of AND Gates 16 through 19 are connected to a Binary Coded Decimal-Decade Decoder 26. The output terminals of AND Gates 16, 17 and 18 are also connected as inputs to a second BCD-Decade Decoder 27. Decoder 27 also receives an input from AND Gate 20.

BCD-Decade Decoders 26 and 27 thus operate to decode the four input signals OD00, OD01, OD02 and OD03 and produce digital outputs shown as 0 through 15. This is effectuated because the OD00, OD01 and OD02 signals are the least significant three pulses of the four pulses decoded by Decoders 26 and 27, thus Decoder 26 decodes the four least significant pulses for all instances when the binary number represented by the four pulses is less than 10. Utilizing BCD, this would provide a possible 16 combinations on the input leads of Decoder 26. However, because a decade decoder is used, only 10 outputs illustrated as 0 through 9 are available from Decoder 26. The other possible combinations 10 through 15 are provided by BCD Decoder 27. This is effected by providing the OD03 pulse to AND Gate 20 through an Inverter 31. Therefore, input pulse combinations 8 through 15 appear as inputs 0-7 to Decoder 27. The 2—7 outputs of Decoder 27 therefore serve as the 10-15 outputs respectively. The A-F designations are the well known hexi-decimal designations.

Because the OD00 through OD03 signals are decoded in BCD Decade Decoders 26 and 27, only one output lead of the 16 leads employed from these two decoders will contain a logic ONE output for a given set of inputs to AND Gates 16 through 20. If desired, a logic ZERO condition can be used to energize the external devices. In either event, the output pulse from Decoders 26 and 27 are the decoded control signals used to actuate the external devices.

The other four OD signals, OD04 through OD07, are utilized in a similar manner to actuate BCD Decoders 28 and 29. Thus, Decoder 28 receives output pulses from AND Gates 21 through 24 and BCD Decoder 29 receives the output pulses from AND Gates 21, 22, 23 and 25. AND Gate 25 is actuated with the inverted OD07 signal so that when OD07 is a logic ZERO, it is inverted to a logic ONE by Inverter 32 to actuate AND Gate 25 and provide a logic ONE input to Decoder 29. Hence, it will now be understood that of the 16 output leads from BCD Decoders 28 and 29, only one will have a logic ONE output pulse for a given combination of the signals OD04 through OD07.

Figure 2:
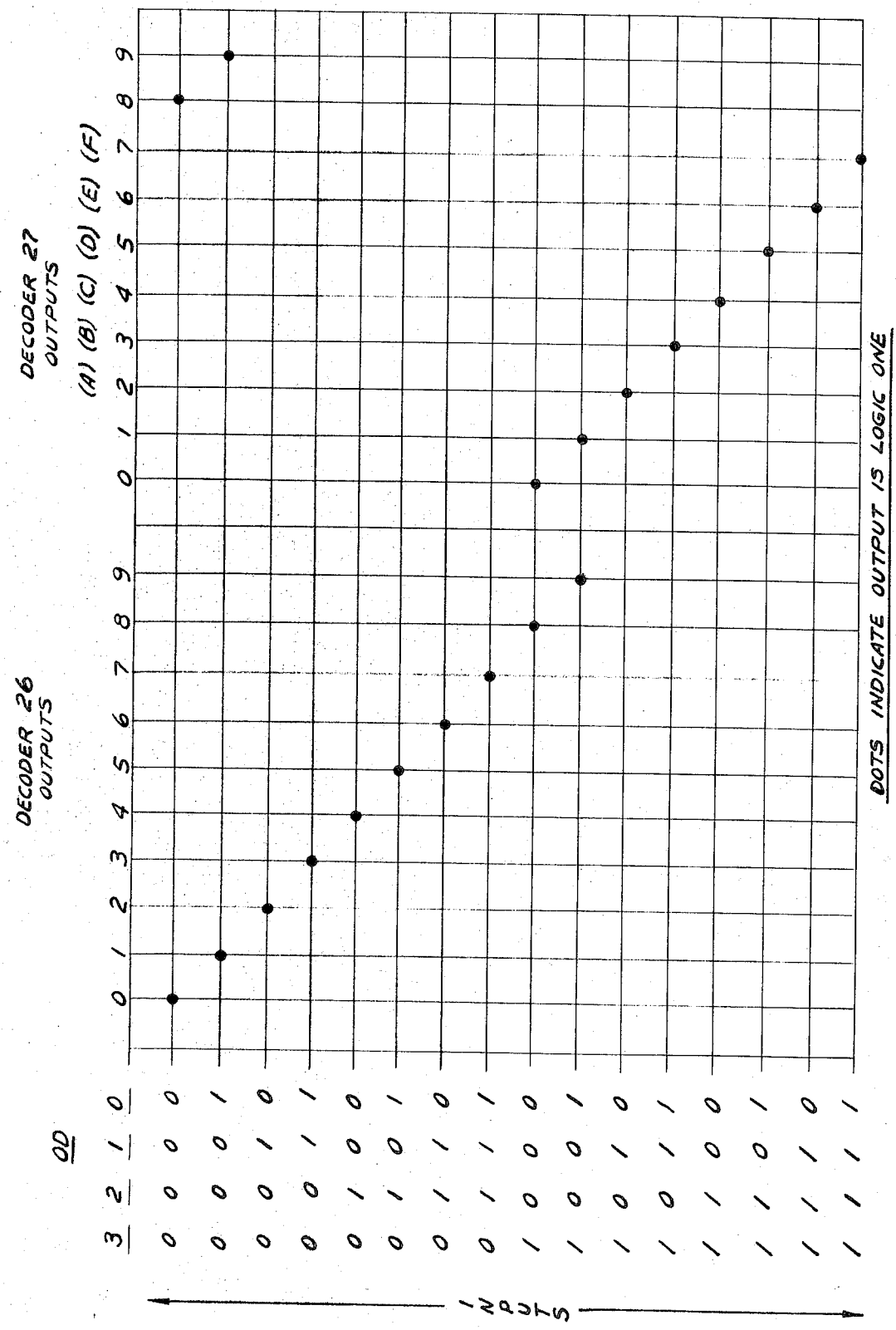
FIG. 2 shows the outputs of Decoders 26 and 27.

FIG. 2 shows the outputs generated by Decoders 26 and 27 for the various combinations of OD signals. Four of Decoder 27 outputs (0, 1, 8, 9) are not used because they are identical to outputs of Decoder 26. It is now apparent that by changing the OD inputs to the two Decoders 26 and 27, the location of a logic ONE will change from one output lead to another.

It should be noted that the output signals of BCD Decoders 27 and 29 are indicated as 10 through 15. However, if one digit output designations are required, which is convenient in many applications, hexi-decimal coding can be utilized so that the output leads identified as 10 through 15 for each of the Decoders 27 and 29 would respectively be identified as A through F as indicated by the alphabetical designations in FIGS. 1 and 2.

The table of outputs shown in FIG. 2 is also applicable to Decoders 28 and 29 and accordingly these two decoders also yield a single logic ONE for each combination of OD04 to OD07 inputs. Accordingly, the eight OD input signals (OD00 to OD07) to AND Gates 16 through 25 result in a two logic ONE conditions on the total of 32 output leads available from Decoders 26 through 29. One of the logic ONE's is provided by Decoders 26 and 27, and the other logic ONE by Decoder 28 or 29. Thus, there are 28 or 256 possible combinations of outputs available from Decoders 26 through 29 and accordingly, 256 external devices can be turned on or off simply by varying the combination of logic ONE and ZERO imputs which form the OD00 through OD07 input pulses.

The great flexibility and saving of address capacity of the computer realized by practicing the inventive concepts can now be appreciated by realizing that a single address is required to actuate AND Gate 13 and the combination of eight input pulses forming the OD inputs to AND Gates 16 through 25 then can be varied in 256 variations to address 256 external devices and turn these devices either on or off or otherwise control their functioning.

I claim:

1. In a numerical control system, a command decoder for selectively controlling a plurality of devices by use of a command word decoded by said command decoder to selectively control said devices through said command decoder, in response to the actuation of said command decoder by the simultaneous reception of a decoder address signal and a device output signal, said command decoder comprising:

first means for receiving said decoder address signal and said device output signal indicating that at least one of said devices is to be controlled, said means for receiving producing an actuating signal in response to the simultaneous reception of said decoder address signal and said device output signal;

second means for receiving said actuating signal and said command word and producing a plurality of logic signals;

third means for receiving said logic signals in parallel form and decoding said command word to produce decoded control signals for selectively controlling said devices in response to said command word.

2. The command decoder of claim 1 wherein said third means for receiving includes a plurality of BCD-decade decoders so that said decoded control signals are available as pulse outputs of said decoders.

3. The command decoder of claim 1 wherein said command word includes a total of $n$ logic ONE's and ZERO's;

said second means for receiving is circuit means including $n$ logic means for individually receiving said logic ONE's and ZERO's and producing logic ONE's for each simultaneous occurrence of said actuating signal and said logic ONE's of said command word.

4. The command decoder of claim 3 wherein said third means for receiving includes decoder means for receiving said logic ONE's and ZERO's from said logic means and decoding said logic ONE's and ZERO's to produce one of $2^n$ possible combinations of decoded signals for energizing one of $2^n$ possible devices.

5. In a numerical control system operative with a computer for sending command signals to devices controlled by said numerical control system, and wherein said computer provides ready signals for indicating that a command signal is available for application to one of said devices, an improvement comprising:
  a command decoder for receiving said ready signals and decoding and transferring said command signals to said devices in response to said ready signals, said commander decoder being addressed by said computer for all of said command signals so that all of said devices can be controlled by a single address.

6. The improvement of claim 5 wherein $n$ logic pulses form said command signals and said command decoder includes $n$ logic means individually receiving said logic pulses so that $2^n$ devices can be energized by said command signals.

7. The improvement of claim 6 wherein said logic means each yield a logic ONE when simultaneously energized by said ready signal and a logic ONE pulse from said command signals, and said logic means each yield a logic ZERO when a command signal logic ZERO is received so that encoded logic ONE's and ZERO's, in parallel form, are supplied by said logic means;
  and further including subdecoder means receiving said encoded logic ONE's and ZERO's and producing $2^n$ combinations of ONE's and ZERO's so that $2^n$ devices can be individually energized by said computer through said command decoder.

8. The improvement of claim 7 wherein said subdecoder means includes a plurality of BCD-decade decoders, each of said decade decoders receiving four of said encoded logic pulses and producing decade outputs.

9. A method of energizing $2^n$ external devices using a single address stored within the computer of a numerical control system including the steps of:
  simultaneously providing a decoder address signal and a device output signal to produce an actuating signal;
  providing a command word composed of $n$ arrangements of two logic states so that said $2^n$ devices can be individually energized;
  combining said actuating signal and said command word and decoding the resulting combination to produce $2^n$ combinations of decoded logic ONE's and ZERO's so that said $2^n$ devices can be separately energized by said command word in accordance with the arrangement of logic ONE's and ZERO's in said command word.

10. The method of claim 9 wherein said decoding is effected in a binary-coded decimal-decade fashion.

* * * * *